United States Patent [19]
Balland

[11] Patent Number: 4,587,151

[45] Date of Patent: May 6, 1986

[54] MOBILE BINDING

[76] Inventor: Francois Balland, 61-63, rue des Praires, 75020 Paris, France

[21] Appl. No.: 639,258

[22] Filed: Aug. 8, 1984

[30] Foreign Application Priority Data

Aug. 11, 1983 [FR] France ................................ 83 13410

[51] Int. Cl.[4] .......................... B32B 1/04; B32B 27/00

[52] U.S. Cl. .................................... 428/156; 206/477; 402/80 R; 428/174; 428/542

[58] Field of Search ........................ 428/174, 156, 542; 402/80 R, 80 P; 281/17, 19 R, 20, 34; 206/477, 480

[56] References Cited

FOREIGN PATENT DOCUMENTS 2803032 7/1978 Fed. Rep. of Germany ........ 402/80

695551 12/1930 France .

2439681 6/1980 France .

*Primary Examiner*—Paul J. Thibodeau

*Attorney, Agent, or Firm*—Young & Thompson

[57] ABSTRACT

The mobile binding consists of two sheets (1 and 2) of cardboard, or similar semi-rigid material, which extend over the whole length of the binding and which are stuck to each other, except at least in the end portions of the spine, and an opening (8) is provided in the inner sheet of cardboard, perpendicular to each of these end portions. The elements holding the magazines consist of clips (9) substantially in a S-form one (9*a*) of whose end branches is designed to be inserted into the middle of a magazine to be bound (10); the other end branch (9*b*) is designed to be inserted through one of the openings (8) of the inner sheet of the spine. Each clip (9) is in molded plastic, its central branch (9*c*) being extended to beyond the portion (9*e*) where it connects to the first end of branch (9*b*), by an overlay (9*d*) in the immediate proximity to the inner sheet.

5 Claims, 3 Drawing Figures

MOBILE BINDING

BACKGROUND OF THE INVENTION

In bindings, referred to as mobile bindings, which are designed to keep a series of magazines assembled together, the latter are generally held in position by rods that are inserted into the central fold of each of the magazines and whose ends are slipped in the grooves of catches fastened to the inside of the spine of the binding.

However the manufacture of catches is relatively costly and their fastening to the spine of the binding somewhat complicated because, for reasons of appearance, it is preferable that the means employed to obtain this fastening, rivets for example, should not be visible from the outside of the back. Moreover, rods have a considerable diameter and increase the length of the magazine.

French Pat. No. 2 439 681 describes a mobile binding consisting of two sheets of cardboard, or similar semi-rigid material which extends over the whole length of the binding and which are glued to each other, except at least in the end portions of the spine, an opening being provided in the internal sheet of cardboard, perpendicular to each of these end portions.

This binding is used with catches in groove form which insert into the openings and which house and hold the ends of the assembly rods. This binding contains no visible rivets but has the drawback or requiring the use of rods.

French Pat. No. 695 551 describes a mobile binding in which the magazines are held by clips formed of a metal wire bent into an S. One of the end branches of the clips is secured to a tab fastened to the spine whereas its other end branch is designed to be inserted into the centre of a magazine to be bound. The binding does not require the use of rods, but experience shows that, under the effect of the weight of the magazine, the clip tends to tilt over.

The purpose of this invention is to provide a binding which avoids these various drawbacks.

BRIEF SUMMARY OF THE INVENTION

The binding according to the invention consists of two sheets of cardboard, or similar semi-rigid material, which extend over the whole length of the binding and which are glued to each other, except at least in the end portions of the spine, an opening being provided in the internal sheet of cardboard perpendicular to each of these end portions and is characterized in that: the parts holding the magazine consist of more or less S-shaped clips one of whose end branches is designed to be inserted in the middle of a magazine to be bound, in that the other end branch is adapted to be inserted to one of the openings of the internal sheet at the spine, and in that the clip is in moulded plastic, its central branch being extended beyond the portion where it connects to the first end branch, by an overlay in immediate proximity to the said internal sheet.

BRIEF DESCRIPTION OF THE DRAWINGS

Below is a description, as a non-limiting example, of a binding according to the invention, with reference to the drawing appended in which.

PARTICULAR DESCRIPTION OF THE DRAWINGS

Figure 1:
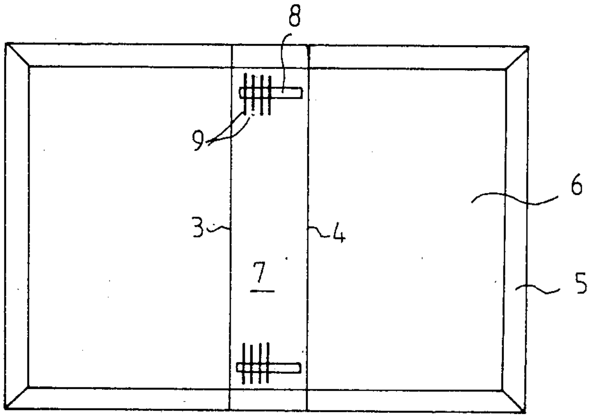
FIG. 1 shows the binding seen from the outside and laid flat

As shown in the drawing, the mobile binding according to the invention consists of two sheets 1 and 2, of cardboard or similar semi-rigid material, which are superposed and in which folding lines 3 and 4 are formed. The outer sheet of cardboard 1 is clad with a decorative sheet 5 whereas the inner sheet 2 is clad with a flyleaf 6. The two sheets 1 and 2 are stuck to each other outside lines 3 and 4, but not in their part 7 between these lines, which has eventually been hot bent and is designed to form the spine of the binding. The flyleaf 6 extends over the whole width of the binding and the decorative sheet 5 contains folds which cover the edges of sheets 1 and 2.

A more or less rectangular opening 8 is provided in the sheet of cardboard 2 and in flyleaf 6 which covers it, close to each end of part 7. Clips 9, in moulded plastic, can be inserted into these openings 8.

Figure 3:
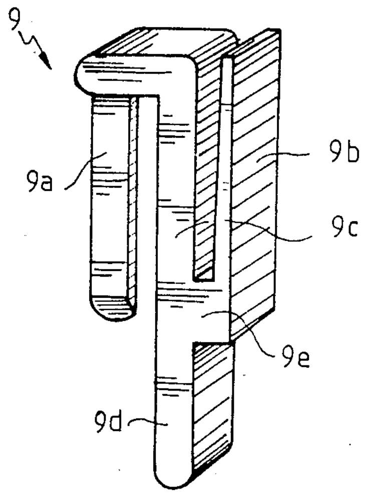
FIG. 3 is a perspective view of a clip.

Each clip 9 is approximately in S-form. One *9a* of its outer branches is relatively thin and lies in the plane of the clip; its end is pointed. Its other outer branch *9b* is also relatively thin, but it lies in a plane perpendicular to that of the clip, as can be seen in FIG. 3; it is pointed and its thickness decreases from point *9e* where it connects to central branch *9c*, to its end. Its central branch *9c* is extended by an overlay *9d*, beyond connection point *9e*.

Each opening 8 has a height a little greater than that of part *9e* of the clip.

Figure 2:
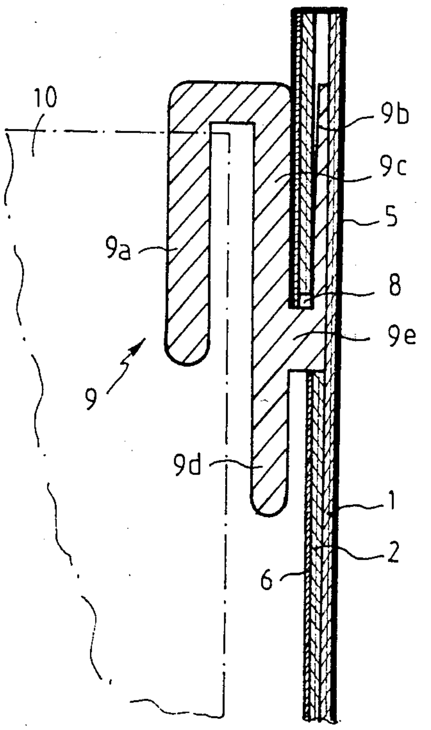
FIG. 2 is a cross-sectional view, at larger scale, of a detail of this binding

To install a clip 9, simply insert its branch *9b* through one of the openings 8, for example upper opening 8, between the two sheets 1 and 2, and apply part *9e* against the lower edge of the opening (see FIG. 2).

To fasten a magazine 10 in a binding, install a clip 9 in each of the openings 8 and insert the branches *9a* of the two clips in the centre of the magazine 10. The branches *9a* which are thin and lie in the plane of the magazine increase the thickness of this magazine very little. The overlays *9d* which are in the immediate vicinity of the inner sheet 2, prevent the clips from tilting over.

What I claim is:

1. Mobile binding comprising two sheets of semi-rigid material, which extend over the whole length of the binding and which are struck to each other, except at least in the end-portions of a spine of the binding, an opening being provided in the inner sheet of material, perpendicular to the spine, and elements for holding magazines, consisting of a clip of substantially S-form at each end of the spine, each clip having two end branches, one of said end branches being adapted to be inserted into the center of a magazine to be bound and the other end branch being adapted to be inserted through one of the openings of the inner sheet at the spine, and each clip having a central branch extended beyond the portion where it connects to said other end branch by an overlay that lies closely adjacent said inner sheet when said other branch is inserted through said opening, said one end branch of the clip being thinner than said other end branch in a direction perpendicular to the plane of the clip.

2. Binding according to claim 1, in which said other end branch lies in a plane substantially perpendicular to that of the clip.

3. Binding according to claim 1, in which said one end branch of the clip is pointed.

4. Binding according to claim 1, in which said other branch of the clip is pointed and its thickness decreases from the point at which it connects to the central branch to its end.

5. Binding according to claim 1, in which the clips are of molded plastic material.

* * * * *